July 10, 1962  L. M. STEPHENSON  3,043,984
TRAVELLING WAVE TUBES
Filed July 29, 1959 2 Sheets-Sheet 1
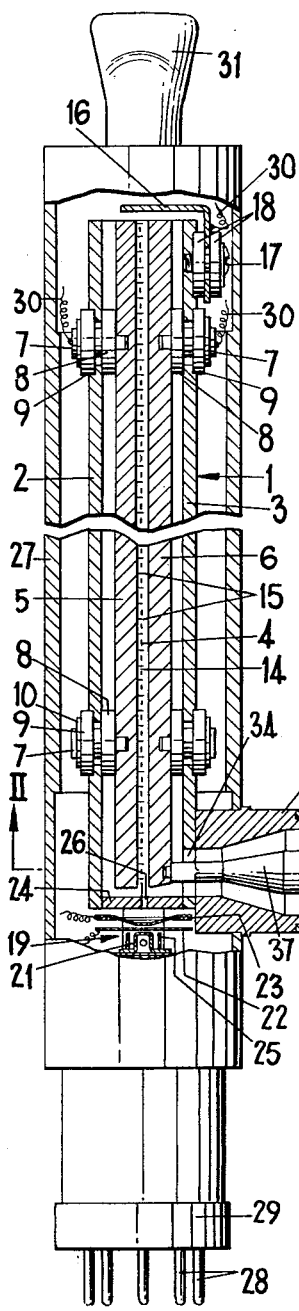
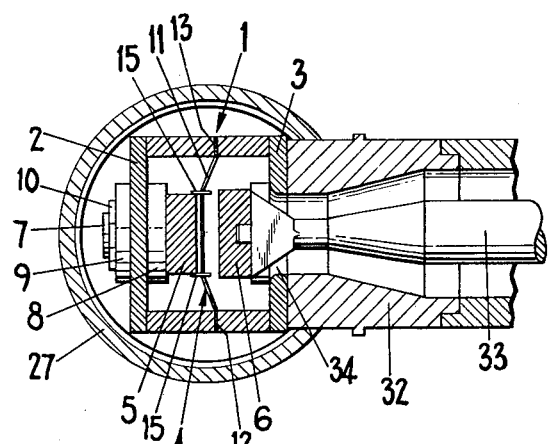
Fig. 2
Fig. 1
INVENTOR
LAWRENCE MICHAEL STEPHENSON
BY
ATTORNEYS July 10, 1962 L. M. STEPHENSON 3,043,984
TRAVELLING WAVE TUBES
Filed July 29, 1959 2 Sheets-Sheet 2

INVENTOR
LAWRENCE MICHAEL STEPHENSON

ATTORNEYS

United States Patent Office 3,043,984
Patented July 10, 1962

1

3,043,984
TRAVELLING WAVE TUBES
Lawrence Michael Stephenson, Stanmore, England, assignor to The M-O Valve Company Limited, London, England
Filed July 29, 1959, Ser. No. 830,294
Claims priority, application Great Britain Sept. 11, 1958
1 Claim. (Cl. 315—3.5)

This invention relates to travelling wave tubes.

In a travelling wave tube, an electron beam is arranged to travel along a channel disposed within an evacuated enclosure and to interact with an electromagnetic wave arranged to travel along a delay device which at least partly defines said channel. The present invention is concerned in particular with travelling wave tubes of the kind in which the delay device is at least partly in the form of a periodic metal structure; by a periodic metal structure is meant a series of similar metallic elements which are spaced apart along a given path (the length of the structure) and all of which extend in a similar manner transversely to said path. The elements may for example take the form of the rungs of a ladder-like structure.

Hitherto, difficulties have been experienced in travelling wave tubes of this kind in operation due to thermal expansion of the metallic elements forming part of the periodic structure, and such difficulties are particularly significant in traveling wave tubes designed to operate at very high frequencies in which the periodic structure has relatively small dimensions and is consequently relatively fragile. Such expansion may cause distortion of the metallic elements and thereby bring about considerable random movement of parts of the elements towards or away from the electron beam and such movement may have a deleterious effect on the operation of the travelling wave tube; for example, reflections of radio frequency energy may occur from a displaced element with a consequent possible reduction in the output of the travelling wave tube, or some of the elements may actually move into the electron beam with a consequent risk of their being burnt out if they are of a fragile nature.

One method which has been adopted in order to alleviate these difficulties is to make saw-cuts at the centres of the elements so that thermal expansion of the elements may take place without risk of their buckling. Such an arrangement however again has disadvantages in cases where the periodic structure is of relatively small dimensions in that the metallic elements may be very fragile and in that there may be a risk of the elements sagging in operation and thereby moving into the path of the electron beam.

It is accordingly an object of the present invention to provide a travelling wave tube including a delay device which is at least partly in the form of a periodic metal structure in which the difficulties discussed above are substantially overcome.

According to the invention, a travelling wave tube includes a delay device incorporating a single periodic metal structure, the periodic metal structure partially bounding a channel which extends along the length of the delay device with the elements of the periodic metal structure extending continuously transverse to the length of the channel, and an electron gun having an electron source disposed adjacent one end of the channel and arranged to project an electron beam into the channel so that in operation the electron beam travels along the length of the channel adjacent the periodic metal structure, each element of the periodic metal structure being anchored at both ends and presenting along at least a considerable portion of its length a concave configuration to the interior of the channel such that in operation any thermal expansion of the element caused by the passage of the

2 electron beam will not bring about a movement of any appreciable part of the element into the path of the electron beam.

According to one aspect of the present invention, in a travelling wave tube in accordance with the immediately preceding paragraph two further metal structures extend on either side of the periodic metal structure, one of the further metal structures partially bounding said channel, and the arrangement is such that, in operation, upon applying suitable potentials to the periodic structure and to the further metal structures such that the periodic structure is at a positive potential with respect to the electron source, said one of the further metal structures is at negative potential with respect to the periodic structure and the other further metal structure is at negative potential with respect to said one of the further metal structures, the electron beam will travel along the channel with an undulatory motion such that it alternately approaches and recedes from the periodic structure with those peaks of the beam forming that set of alternate peaks disposed adjacent the periodic structure being respectively disposed in the vicinities of the gaps between the elements of the periodic structure.

One arrangement in accordance with the invention will now be described by way of example with reference to the accompanying drawings, in which:

FIGURE 1 is a side elevation, shown partly in section, of a travelling wave tube adapted to operate as a backward wave oscillator, the section being taken along the longitudinal axis of the tube;

FIGURE 2 is an enlarged sectional elevational of the tube, the section being taken along the line II—II of FIGURE 1;

Figure 3:
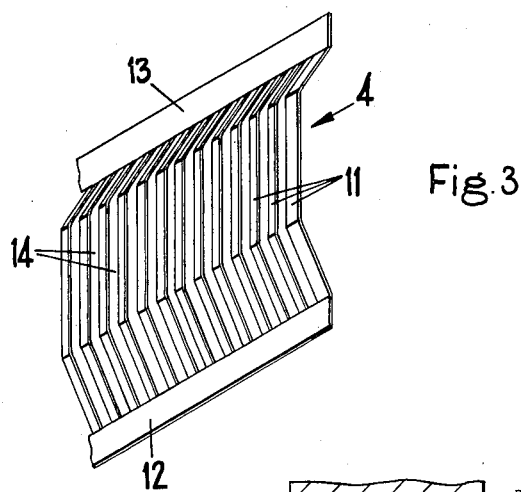
FIGURE 3 is a perspective view of part of a periodic metal structure incorporated in the tube.

Referring to the drawings, the delay device of the travelling wave tube includes a tubular metal member 1, of rectangular cross-section, which is formed by two channel members 2 and 3 of U-shaped cross-section. The delay device also includes a periodic metal structure 4 which extends along the whole length of the member 1, and two metal focussing plates 5 and 6 which are disposed inside the member 1 and on either side of the periodic structure 4; the plates 5 and 6 extend for almost the whole length of the member 1 with their main faces parallel to the bases of the channel members 2 and 3.

The focussing plates 5 and 6 each have a width of 0.5 centimetre, and are accurately positioned in the member 1 with their adjacent main faces spaced 0.11 centimetre apart, the plates 5 and 6 being respectively secured to the bases of the channel members 2 and 3 by means of a number of studs 7 one end of each of which is brazed to the relevant plate 5 or 6. Each plate 5 or 6 is accurately spaced, and electrically insulated, from the relevant channel member 2 or 3 by means of a number of ceramic washers 8, and each channel member 2 or 3 is electrically insulated from the heads of the relevant studs 7 by means of a number of further ceramic washers 9; each washer 9 is held in position by means of a spring clip 10 which is trapped between the washer 9 and the head of the associated stud 7. It should be appreciated that the plates 5 and 6 effectively form the ridges of a ridged waveguide the walls of which are formed by the tubular member 1.

Referring now particularly to FIGURE 3 of the drawings, the periodic structure 4 includes a series of seventy metal strips 11, each 0.038 centimetre wide except for the end strip at one end of the structure, which extend transversely to the length of the period structure 4, the ends of each strip 11 being respectively formed integral with two longitudinal strips 12 and 13. The strips 11 are spaced equal distances apart, a slot 14, 0.089 centimetre wide, being formed between each adjacent pair of strips 11. The strips 11 are all bent in a similar manner so that each strip 11 is formed by three straight portions, and the periodic structure 4 is mounted in position in the member 1 with the longitudinal strips 12 and 13 clamped between the channel members 2 and 3 (see FIGURE 2), the periodic structure 4 being so arranged that the strips 11 each present a concave configuration to the plate 6. The periodic structure 4 is arranged so that the central straight portion of each strip 11 extends across the whole width of the plates 5 and 6 and is disposed parallel to the main faces of the plates 5 and 6, the central portion being disposed 0.018 centimetre from the plate 5 and 0.084 centimetre from the plate 6.

A number of metal pins 15 are secured to the long narrow sides of the plate 5, the pins 15 projecting just over half-way across the gap between the plates 5 and 6. The arrangement is such that a pair of pins 15 project through each slot 14, each pair of pins 15 being symmetrically disposed with respect to the relevant slot 14. For convenience, each series of pins 15 secured to a side of the plate 5 is formed from a periodic structure similar to the structure 4 except that it is flat, the pins 15 being formed by parts of the transverse strips of the structure and being connected together by one of the longitudinal strips of the structure.

The travelling wave tube includes a collector electrode 16 part of which is disposed transverse to the length of the tube and about 0.25 centimetre from one end of the periodic structure 4, the electrode 16 being secured to the channel member 3 by means of two bolts 17 (only one of which is seen in the drawings); electrode 16 is electrically insulated from the channel member 3 by further ceramic washers 18.

The travelling wave tube includes an electron gun 19 disposed adjacent that end of the tubular member 1 remote from the collector electrode 16 and designed to project a strip-like beam 20 of electrons into the space between the periodic structure 4 and the plate 6. The electron gun 19 includes an indirectly heated cathode 21, three anodes 22, 23 and 24, and a heat shield 25. The anode 24 is in the form of a plate which closes that end of the tubular member 1 remote from the collector electrode 16, and the anodes 22, 23 and 24 respectively have formed in them three strip-like apertures such as 26 which extend in directions parallel to the main faces of the plates 5 and 6 and through which the electron beam 20 passes before emerging from the gun 19 in operation; the aperture 26 has a width of 0.063 centimetre.

Figure 4:
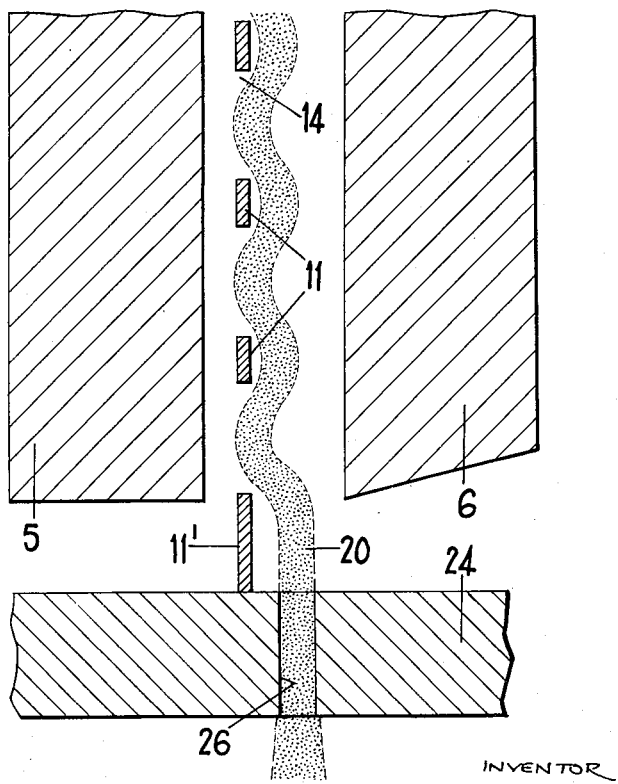
FIGURE 4 is a schematic representation of part of the tube, illustrating its mode of operation.

As is clearly shown in FIGURE 4 of the drawings, that strip 11' of the periodic structure 4 adjacent the electron gun 19 is wider than the remaining strips 11 and abuts against the anode plate 24 on that side of the aperture 26 nearer the plate 5.

The assembly described above is mounted in an evacuated tubular metal envelope 27 of circular cross-section, the major part of which has an external diameter of 1.9 centimetres. A number of pins 28 are sealed through an insulating base 29 at one end of the envelope 27 and are electrically connected to the focussing plates 5 and 6, the collector electrode 16, the cathode 21, and the anodes 22 and 23 by means of schematically indicated electrical leads 30. A pumping stem 31 is provided at the other end of the envelope 27, the stem 31 being pinched off when the evacuation of the envelope 27 has been completed during manufacture. The tubular member 1 is supported inside the envelope 27 by virtue of the longitudinal edges of the member 1 bearing against the inner surface of the envelope 27 as clearly shown in FIGURE 2.

A tubular metal member 32 of circular cross-section is sealed through the wall of the envelope 27, opposite the end of the member 1 adjacent to the electron gun 19, the axis of the member 32 being perpendicular to the axis of the envelope 27 and one end of the member 32 being secured to the base of the channel member 3. A metal rod 33 passes through, and is arranged coaxially with, the tubular member 32; one end of the rod 33 is brazed to the focussing plate 6, the rod 33 passing through a circular aperture 34 formed in the channel member 3 in register with the narrow end of the bore of the member 32. The free end of the rod 33 is surrounded by a glass bulb 35 sealed to a circumferential flange 36 provided at the free end of the member 32 so as to hermetically seal the envelope 27. A mica washer 37 fits tightly around the rod 33 and inside the member 32, the washer 37 serving to locate and support the rod 33 with respect to the member 32. The end of the rod 33 is designed to project into, and approximately half-way across the narrow internal dimension of, a waveguide 38 which is provided with an aperture to accommodate the member 32. The tubular member 32 and the rod 33 together constitute a section of coaxial conductor transmission line which forms a radio frequency output connection for the travelling wave tube, one end of the line being effectively connected to one end of the delay device constituted by the tubular member 1, the periodic structure 4 and the plates 5 and 6, and the other being terminated by an antenna which is formed by the projecting end of the rod 33 and is adapted to excite a wave in the waveguide 38.

In operation, the cathode 21, the anodes 22, 23 and 24, and the focussing plates 5 and 6 are connected to appropriate voltage sources (not shown) such that the anode 24 (which is electrically connected to the periodic structure 4, the tubular member 1 and the envelope 27) is earthed, an appropriate negative potential is applied to the cathode 21, a potential of about 12 volts positive with respect to the cathode potential is applied to the anode 22, a negative potential of about 100 volts is applied to the anode 23, an appropriate negative potential is applied to the plate 5 and an appropriate negative potential (less than that applied to the plate 5) is applied to the plate 6. The potential applied to the cathode 21 can be varied between 300 and 1500 volts, the potential applied to the plate 5 can also be varied between 300 and 1500 volts and and the potential applied to the plate 6 can be varied between 100 and 500 volts; the ratios of the potentials respectively applied to the cathode 21 and the plates 5 and 6 should be kept substantially constant.

The arrangement is such that the electron beam 20 is focussed as it travels along the channel partly defined by the periodic structure 4 and the plate 6, the focussing action (which is illustrated in FIGURE 4) being brought about as follows. The application of the potentials to the periodic structure 4 and the plates 5 and 6 causes an electrostatic field to be set up between each strip 11 of the periodic structure 4 and each of the plates 5 and 6, the field being directed away from the strips 11 towards the plates 5 and 6. After the electron beam 20 emerges from the aperture 26, it comes under the influence of the electrostatic field between the structure 4 and the plate 6 and is directed towards the first slot 14 in the structure 4. Upon reaching the region of this slot 14, the beam 20 is bent away from the plate 5 and towards the plate 6 due to the electrostatic field between the plates 5 and 6 passing through this slot 14. The beam 20 is then bent again towards the plate 5 by virtue of the electrostatic field between the first strip 11 and the plate 6. The electrostatic field distribution along the general direction of travel of the beam 20 is such that there is an overall focussing action upon the beam in directions perpendicular to the plates 5 and 6 and the beam 20 travels along the channel defined by the structure 4 and the plate 6 with an undulatory motion such that it approaches the plates 5 and 6 in turn until it is incident upon the collector electrode 16, one set of peaks of the beam 20 being respectively disposed in the vicinities of the slots 14.

In operation, oscillations are set up in the travelling wave tube by virtue of interaction between the electron beam 20 and an electromagnetic wave propagated along the delay device constituted by the tubular member 1, the periodic structure 4 and the plates 5 and 6, in a sense opposite to the direction of flow of the electron beam 20. A radio frequency output signal is obtained from the travelling wave tube by means of the waveguide 38 and the section of coaxial conductor transmission line formed by the tubular member 32 and the rod 33. The oscillation frequency of the travelling wave tube can be varied by varying the magnitude of the potentials applied to the cathode 21 and to the focussing plates 5 and 6.

It is found that, in the arrangement described above, there is no significant dispersion of the electrons in the beam 20 in directions perpendicular to the plates 5 and 6 and that a large percentage of the electrons passing through the aperture 26 are collected by the collector electrode 16. The loss in transmission that does occur is mainly due to lateral dispersion of the beam 20 in directions substantially parallel to the plates 5 and 6; it should be appreciated that such dispersion is considerably reduced by virtue of the provision of the pins 15.

As stated above, the peaks forming one set of alternate peaks of the beam 20 are respectively disposed in the vicinities of the slots 14 formed in the periodic structure 4, and it should be appreciated that each of these peaks coincides with a region of maximum axial electric field so that in operation there is a very good interaction between the electron beam 20 and the electromagnetic wave.

It should be appreciated that, in the travelling wave tube described above, any thermal expansion of a strip 11 of the periodic structure 4 brought about in operation by virtue of the passage of the electron beam 20 will cause the strip 11 to move away from the electron beam 20 and thereby tend to reduce the temperature of the strip 11. Moreover, any movement of the strips 11 in directions away from the electron beam 20, brought about by a rise in temperature of the strips 11, is less than the corresponding movement of the elements of a flat ladder-like structure incorporated in a travelling wave tube of similar type which would be brought about by the same rise in temperature.

It will be further appreciated that any movement of a strip 11 for the periodic structure 4 away from the beam 20 entails movement of the strip 11 towards the focussing plate 5 with a consequent change in the electrostatic fields such that the electron beam 20 will be bent more sharply away from the periodic structure 4; thus by using an arrangement in accordance with the present invention, it is possible to arrange that in operation any deviation of the electron beam 20 from its desired path is automatically compensated for. Other advantages of the travelling wave tube described above over a travelling wave tube of similar type in which the delay device includes a flat periodic structure are that the periodic structure 4 of the travelling wave tube described above has greater mechanical rigidity and is less prone to any significant mechanical resonance.

I claim:

A travelling wave tube including a delay device incorporating a single periodic metal structure, the periodic metal structure partially bounding a channel which extends along the length of the delay device with the elements of the periodic metal structure extending continuously transverse to the length of the channel, an electron gun having an electron source which is disposed adjacent one end of the channel and which projects an electron beam into the channel so that in operation the electron beam travels along the length of the channel adjacent the periodic structure, each element of the periodic metal structure being anchored at both ends and presenting along at least a considerable portion of its length a concave configuration to the interior of the channel such that in operation any thermal expansion of the element caused by the passage of the electron beam will not bring about a movement of any appreciable part of the element into the path of the electron beam, and two further metal structures extending one on either side of the periodic metal structure with one of the further metal structures partially bounding said channel, said further metal structures being electrically insulated from each other and from the periodic metal structure, whereby in operation upon applying suitable potentials to the periodic structure and to the further metal structures such that the periodic structure is at a positive potential with respect to the electron source, said one of the further metal structures is at a negative potential with respect to the periodic metal structure and the other further metal structure is at a negative potential with respect to said one of the further metal structures, the electron beam will be focussed electrostatically, the beam travelling along the channel with an undulatory motion such that it alternately approaches and recedes from the periodic structure with these peaks of the beam forming that set of alternate peaks disposed adjacent the periodic structure being respectively disposed in the vicinities of the gaps between the elements of the periodic structure.

References Cited in the file of this patent

UNITED STATES PATENTS

| 2,768,322 | Fletcher | Oct. 23, 1956 |
| 2,857,548 | Kompfner et al. | Oct. 21, 1958 |
| 2,882,440 | Mourier | Apr. 14, 1959 |
| 2,889,486 | Guenard et al. | June 2, 1959 |
| 2,899,597 | Kompfner | Aug. 11, 1959 |
| 2,926,281 | Ashkin | Feb. 23, 1960 |
| 2,941,114 | Cook | June 14, 1960 |

FOREIGN PATENTS

| 1,086,890 | France | Aug. 18, 1954 |
| 776,072 | Great Britain | June 5, 1957 |